(12) United States Patent
Rickle et al.

(10) Patent No.: US 6,471,072 B1
(45) Date of Patent: Oct. 29, 2002

(54) FILTER WITH PUMP RETAINING FEATURE

(75) Inventors: Gary L. Rickle, Wharton; Christopher A. Schoonover, Lima, both of OH (US); Kevin B. Murphy, Meriden; Deborah M. Cashin, Cheshire, both of CT (US)

(73) Assignee: Kuss Corporation, Findlay, OH (US)

( * ) Notice: Subject to any disclaimer, the term of this patent is extended or adjusted under 35 U.S.C. 154(b) by 0 days.

(21) Appl. No.: 09/668,761

(22) Filed: Sep. 22, 2000

(51) Int. Cl.7 ................................................ B01D 39/00
(52) U.S. Cl. .................... 210/486; 210/238; 210/416.4; 210/459; 210/488; 210/495; 210/499
(58) Field of Search ................................ 210/488, 459, 210/495, 461, 416.4, 249, 470, 471, 486, 499, 237–238; 417/313; 415/121.2; 264/DIG. 48, 154–156, 163

(56) References Cited

U.S. PATENT DOCUMENTS

| 4,617,121 A | 10/1986 | Yokoyama | |
|---|---|---|---|
| 5,049,271 A | 9/1991 | Cain | |
| 5,055,187 A | 10/1991 | Ito et al. | |
| 5,409,608 A | 4/1995 | Yoshida et al. | |
| 5,547,568 A | 8/1996 | Sasaki | |
| 5,607,578 A | * 3/1997 | Ohkouchi et al. | .......... 210/172 |
| 5,665,229 A | 9/1997 | Fitzpatrick et al. | |
| 5,795,468 A | 8/1998 | Reising et al. | |
| 5,876,599 A | * 3/1999 | Sylester et al. | .......... 210/416.4 |
| 5,925,245 A | 7/1999 | Bradford et al. | |

* cited by examiner

Primary Examiner—Matthew O. Savage
Assistant Examiner—Marianne Ocampo
(74) Attorney, Agent, or Firm—Brinks Hofer Gilson & Lione

(57) ABSTRACT

A fuel filter for use in a fuel filter/pump/sensor module and method of making same provides an in-tank fuel filter having a novel retaining member for securing the body of the filter in a position adjacent the housing of a fuel pump to which it is connected. The filter includes a fabric body, an in-situ molded outlet fitting on the top side of the fabric body and runners or contact points on the underside of the body. The fabric body may be a single folded fabric swatch or a plurality of swatches sealed about the open edges. The outlet fitting cooperatively engages the inlet of a fuel pump. A retaining member formed on the periphery of the body engages the housing of the fuel pump and positions the filter body adjacent the housing.

12 Claims, 4 Drawing Sheets

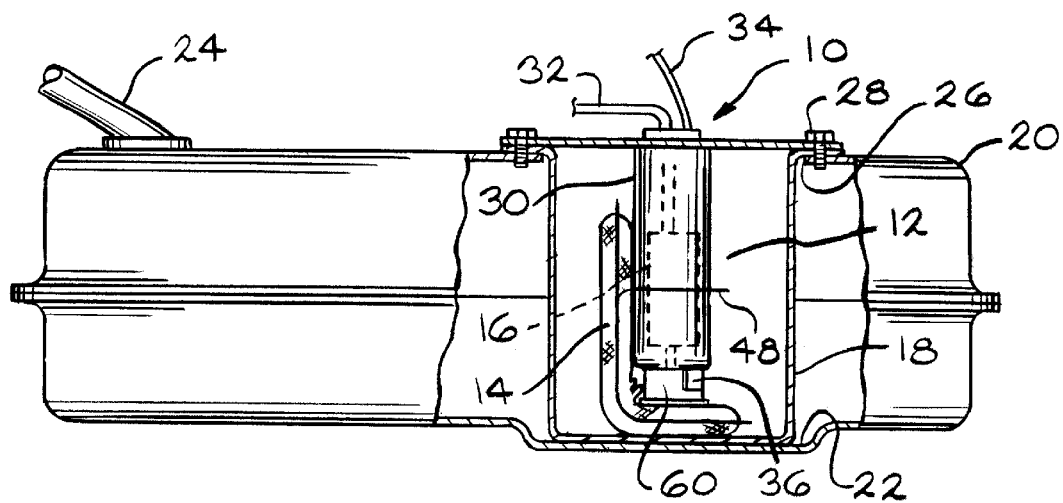
FIG. 1
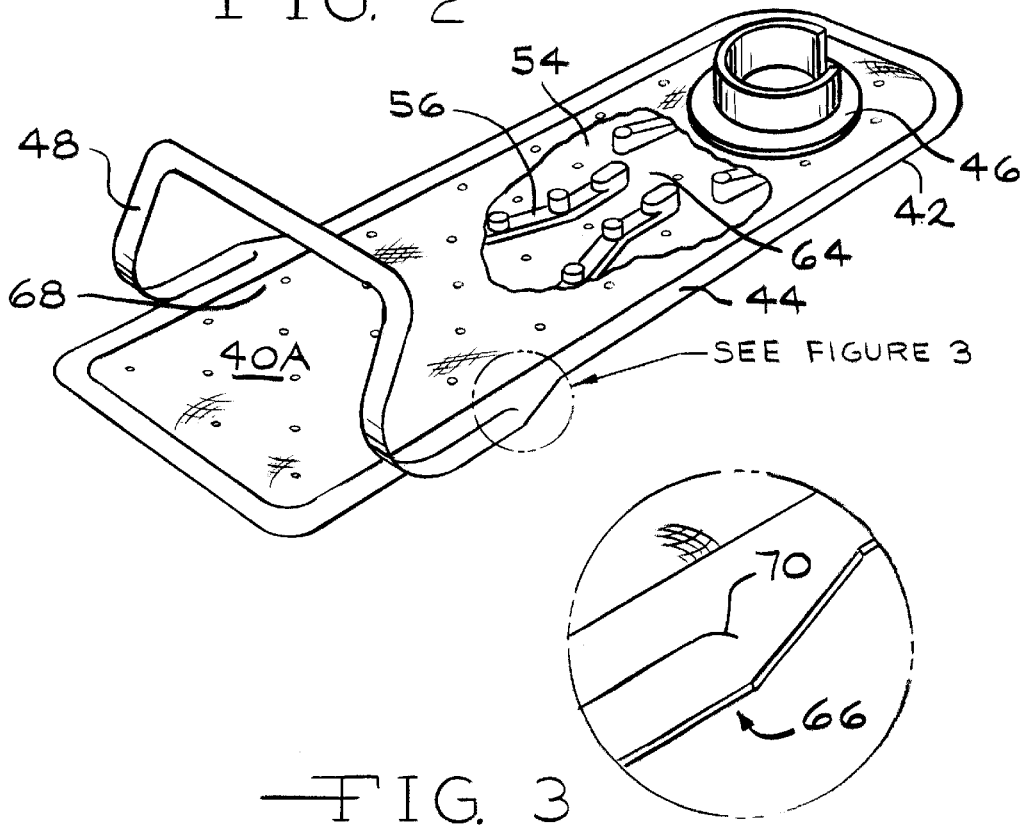
FIG. 2
FIG. 3

FILTER WITH PUMP RETAINING FEATURE

BACKGROUND OF THE INVENTION

The invention relates generally to in-tank fuel filters and more specifically to an in-tank fuel filter having a retaining member disposed on the periphery of the filter body for retaining the filter adjacent the body of an associated fuel pump.

The modular assembly approach to vehicle manufacture increasingly demanded and practiced by automobile manufacturers has affected the design and componentry of motor vehicles in numerous ways. With regard to fuel systems, and particularly the fuel supply and filtration components, fuel filters have changed from a single, in-line assembly typically disposed under the hood and adjacent the carburetor, such as disclosed in U.S. Pat. No. 4,036,758, to modular designs wherein a filter, fuel pump and fuel level sensor constitute an assembly which is disposed within and secured to the fuel tank. Such an in-tank filter is described in U.S. Pat. No. 4,961,850.

These assemblies are often pre-assembled for subsequent placement of the whole within a module housing, which is ultimately placed into a fuel tank. This modular approach is designed to decrease the amount of time spent placing the assembly into the fuel tank. However, due to the separate and distinct nature of the material, shape and configuration of a typical fuel filter from those of a typical fuel pump, typical assemblies are bulky combinations of the elements, which may make subsequent placement into the module housing difficult. For example, due to the typical flexible nature of a fuel filter, the body of the fuel filter may exert a force against the interior of the module housing, making proper placement and positioning difficult, and possibly decreasing filter efficiency. As a consequence of this problem, the time required to assemble the completed module may increase, possibly negating any time saved during subsequent placement of the module into the fuel tank. More significant consequences, such as damage to the module, its individual components, or even the fuel tank may also result.

For the foregoing reasons, there is a need for an improved design of in-tank fuel filters that maintain the proximity between the filter and the pump within the module housing.

SUMMARY OF THE INVENTION

The present invention is directed to an in-tank fuel filter that satisfies this need and a method of making same. The fuel filter includes a novel retaining member for securing the filter in a position adjacent the body of an associated fuel pump. The in-tank fuel filter according to the present invention comprises a body having upper and lower panels of filtration media, a peripheral seal formed along the common edges of the panels, an outlet fitting for mounting the filter to an in-tank fuel pump inlet, and a retaining member on the periphery of the body. Preferably, the retaining member is a U-shaped member formed from the peripheral seal. The retaining member defines an opening with either the upper or lower panel of filtration media that engages the body of a fuel pump to which the fuel filter is attached. Also preferably, the retaining member is integrally formed from the seal of the filter periphery. Also preferably, the retaining member defines spurs that direct tearing of the retaining member away from the filter body. In an alternate embodiment, the retaining member constitutes a separate member attached to the peripheral seal of the filter body by any suitable means.

The panels of filtration media preferably comprise an outer layer of extruded mesh and at least a single layer of fine non-woven filtration material, preferably composed of spun-bonded nylon filaments or other spun-bonded materials such as polyester, acetal, Teflon, or other stable, fuel impervious material. However, the panels may be composed of a single layer or several layers of any suitable filtration media.

The outlet fitting is made of a fuel compatible material and may be either multiple part device or in-situ molded on one of the panels of filtration media. Separating ribs may be in-situ molded on one of the panels of filtration media or a stuffer may be disposed in the interior of the filter to prevent its collapse and improve fuel withdrawal through the outlet fitting. Runners or contact points may be disposed on the underside of the filter body to prevent blockage of the filtration media by the surface of the fuel tank and to improve fuel flow through the filtration media.

The integrally formed retaining member is produced by cutting through the peripheral seal using a cutting die having a cutting pattern complementary to the shape of the retaining member and having a width smaller than that of the filter body at the area where the member is to be formed. By mechanically forcing the die through the peripheral seal, the seal is partially severed and the retaining member is formed.

It is thus an object of the present invention to provide an in-tank fuel filter having a retaining member formed on the periphery of the filter body for securing the filter in a position adjacent the body of a connected fuel pump.

It is a further object of the present invention to provide an in-tank fuel filter having a retaining member formed from the periphery of the filter body.

It is a still further object of the present invention to provide an in-tank fuel filter having a retaining member that constitutes a separate member that is fixedly attached to the periphery of the filter body.

It is a still further object of the present invention to provide an in-tank fuel filter having a retaining member that defines spurs that direct tearing of the retaining member away from the filter body.

It is a still further object of the present invention to provide an in-tank fuel filter having a retaining member that engages the body of a connected fuel pump.

It is a still further object of the present invention to provide an in-tank fuel filter which exhibits excellent securement properties due to the retaining member formed on the periphery of the filter body.

It is a still further object of the present invention to provide an in-tank fuel filter which imports excellent dimensional and shape stability onto a filter/pump assembly due to the securement of the filter in a position adjacent to the body of the pump by the retaining member.

It is a still further object of the present invention to provide a method of fabricating an in-tank fuel filter having a retaining member wherein the peripheral seal of the filter body is partially severed with a cutting die to integrally form the retaining member from the seal.

Further objects and advantages of the present invention will become apparent by reference to the following description of the preferred embodiment and appended drawings wherein like reference numbers refer to the same feature, element or component.

BRIEF DESCRIPTION OF THE DRAWINGS

FIG. 1 is a diagrammatic, side elevational view of an automobile fuel tank having an in-tank fuel filter and pump module according to the present invention;

FIG. 2 is a perspective view of an in-tank fuel filter with a portion broken away having a retaining member formed from the periphery of the fuel filter according to the present invention;

FIG. 3 is a fragmentary, enlarged view of the junction area between the peripheral seal and a retaining member formed from the peripheral seal of an in-tank fuel filter according to the present invention;

DESCRIPTION OF THE PREFERRED AND ALTERNATE EMBODIMENTS

Figure 4:
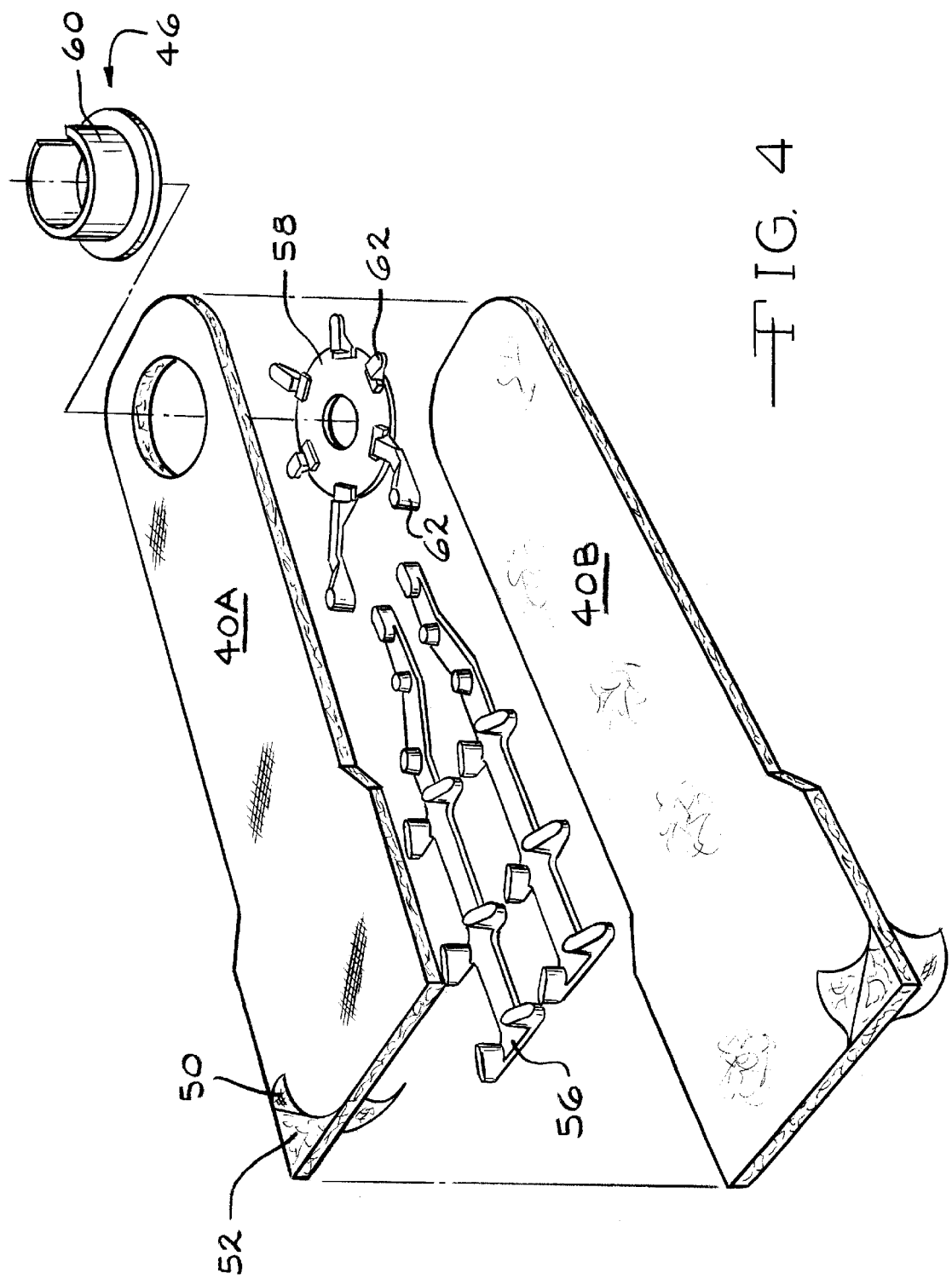
FIG. 4 is an exploded, perspective view of an in-tank fuel filter according to the present invention.

Referring now to FIG. 1, an in-tank fuel module according to the present invention is illustrated and generally designated by the reference number 10. The fuel module 10 includes a fuel pump assembly 12 comprising a fuel filter 14 and an electric fuel pump 16 disposed in a module housing 18. The module housing 18 is installed in a vehicle fuel tank 20 which may include a well 22 to facilitate maximum fuel removal from the tank 20 and does include a filler tube 24 for providing gas or other vehicle fuel to the fuel tank 20. The fuel module 10 containing the fuel pump assembly 12 is mounted in an opening 26 in the top of the fuel tank 20 and may be sealingly secured therein by a suitable gasket (not illustrated) and fasteners 28 such as sheet metal screws, similar fasteners or other securement means such as a threaded ring (not illustrated). The fuel pump 16 includes a fuel pump housing 30 which encloses and protects the electric fuel pump 16 which provides fuel under pressure in an outlet or supply line 32 and which is provided with electrical energy through a wire or cable 34. The fuel filter 14 is releasably and cooperatively connected to a fuel inlet fitting 36 on the fuel pump housing 30. The fuel module 10 may also include a fuel level sensor and suitable output cable (both not illustrated).

Referring now to FIGS. 2 through 6, the fuel filter 14 includes a first panel of filtration media 40A and a second panel of filtration media 40B which are complementary in shape and define a common edge 42. The panels of filtration media 40A and 40B are preferably formed from a unitary swatch of filtration media that has been folded. A peripheral seal 44 is formed along at least a portion of the common edge 42 and preferably adjacent but spaced from the fold. The peripheral seal 44 can be formed by a variety of sealing means, including exposure to thermal, radio frequency, or ultrasonic energy. The filtration media extending beyond the peripheral seal 44 and defining the fold is subsequently trimmed and discarded. The fuel filter 14 has a fuel outlet fitting 46 secured to the first panel of filtration media 40A and a retaining member 48 formed from a portion of the peripheral seal 44.

Figure 5:
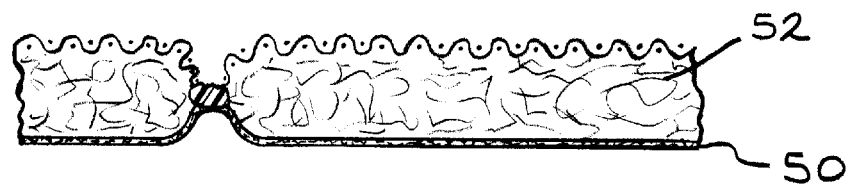
FIG. 5 is a fragmentary, enlarged, cross-sectional view of the outer shell and filtration media of one panel of an in-tank fuel filter according to the present invention.

As best illustrated in FIGS. 4 and 5, the swatch of filtration media preferably includes at least two distinct layers of material. The outer exterior shell or layer 50 is a relatively coarse extruded mesh of any suitable fuel tolerant and impervious material, e.g., nylon, polyester, acetal, or Teflon. Teflon is a registered trademark of the E.I. DuPont de Nemours Co. The term "relatively coarse" means that the exterior layer 50 contributes relatively little to the fuel filtration process except on the largest scale. Rather, the extruded mesh of the exterior layer 50 provides an exceptionally stable and abrasion resistant outer covering for the fuel filter 14. The inner layer of filtration media 52 is a relatively fine layer of spun-bonded filaments.

The peripheral seal 44 secures the first panel of filtration media 40A to the second panel of filtration media 40B, thereby providing an interior space 54 between the first panel of filtration media 40A and the second panel of filtration media 40B. Preferably molded in-situ on the second panel of filtration media 40B are one or more separating ribs 56 having sufficient internal height above the upper surface of the second panel of filtration media 40B to maintain separation of the first panel of filtration media 40A and the second panel of filtration media 40B such that the interior space 54 is maintained and fuel flow therebetween and into the outlet fitting 46 is facilitated. Alternatively, the separating ribs 56 may either be disposed within the interior space 54 or be in-situ molded, either with or independently of the outlet fitting 46, on the first panel of filtration media 40A to achieve such separation and facilitate fuel flow.

Preferably, the outlet fitting 46 is disposed adjacent an opposite end of the fuel filter 14 from the retaining member 48, and is circular in shape. The outlet fitting 46 is preferably fabricated of nylon or other fuel tolerant and impervious material such as acetal or polyester and is preferably molded in-situ on the first panel of filtration media 40A. Alternatively, the outlet fitting 46 may be assembled from two or more interengageable parts.

In the preferred embodiment, the outlet fitting 46 defines an interior portion 58 and an exterior portion 60. The interior portion 58 is disposed within the interior space 54 and defines a plurality of interspersed projections 62. The projections 62 have sufficient internal height from the lower surface of the first panel of filtration media 40A to maintain separation of the first panel of filtration media 40A and second panel of filtration media 40B such that the interior space 54 in the area of the outlet fitting 46 is maintained and fuel flow therebetween and into the outlet fitting 46 is facilitated. In this sense, the interior portion 58 of the outlet fitting 46 serves to maintain the interior space 54 in a manner similar to that of the separating ribs 56. The projections 62 that extend in the direction of the separating ribs 56 are positioned in a manner so as to form a hinge region 65 in the filter body. The projections 62 and the separating ribs 44 are positioned in a manner that imparts flexibility to the hinge region 64. This configuration allows the fuel filter 14 to bend at the hinge region 64, thereby maintaining proximity between the fuel pump housing 30 connected to the fuel filter 14 at the outlet fitting 46 and the body of the fuel filter 14 retained to the fuel pump housing 30 by operation of the retaining member 48.

Figure 6:
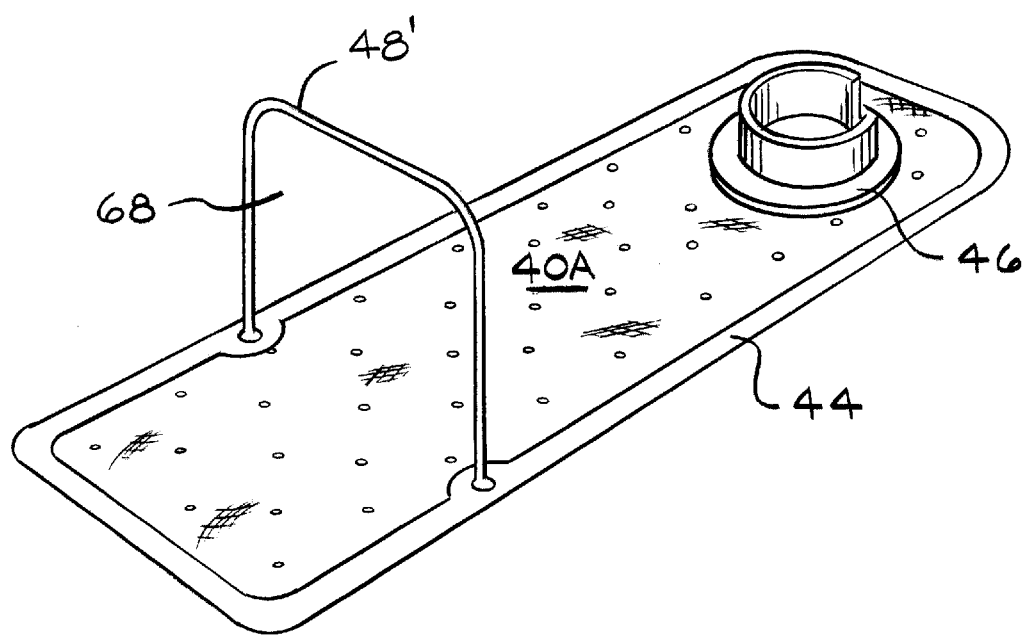
FIG. 6 is a perspective view of an in-tank fuel filter having a first alternate embodiment of a retaining member constituting a separate body attached to the peripheral seal of a fuel filter according to the present invention.

The retaining member 48 is formed from a portion of the peripheral seal 44. The retaining member 48 is complementary in shape to one end of the fuel filter 14 and joins the peripheral seal 44 at at least two junction areas 66. Preferably, the retaining member 48 is formed from the peripheral seal 44 such that the junction areas 66 and the retaining member 48 are continuous with the peripheral seal 44. In an alternate embodiment, as depicted in FIG. 6, a retaining member 48' is comprising a separate band, belt single strand or thread of multiple strands of material fixedly attached to the peripheral seal 44 by fastening means, such as autogenous bonding 49, adhesives or mechanical fasteners such as rivets. The retaining members 48 and 48', no matter how formed or secured to the peripheral seal 44, cooperatively forms an aperture or opening 68 with either the first panel of filtration media 40A or the second panel of filtration media 40B. The panel used to define the opening 68 depends on whether the retaining member 48 is positioned towards the first panel of filtration media 40A or the second panel of filtration media 40B. Preferably, the retaining member 48 can easily be alternated between both positions.

In the preferred embodiment, the retaining member 48 defines spurs 70 that curve away from the center of the fuel filter 14. The spurs are best illustrated in FIG. 3. As used herein, the term "spur" means a curved or linear continuation of a line or path that extends at an angle to that line or path. The spurs 70 direct any tearing of the retaining member 48 away from the body of the fuel filter 14. The spurs 70 ensure that only damage resulting from a tear of the retaining member 48 occurs at the junction areas 66 and precludes damage from such force to the body of the fuel filter 14.

Figure 7:
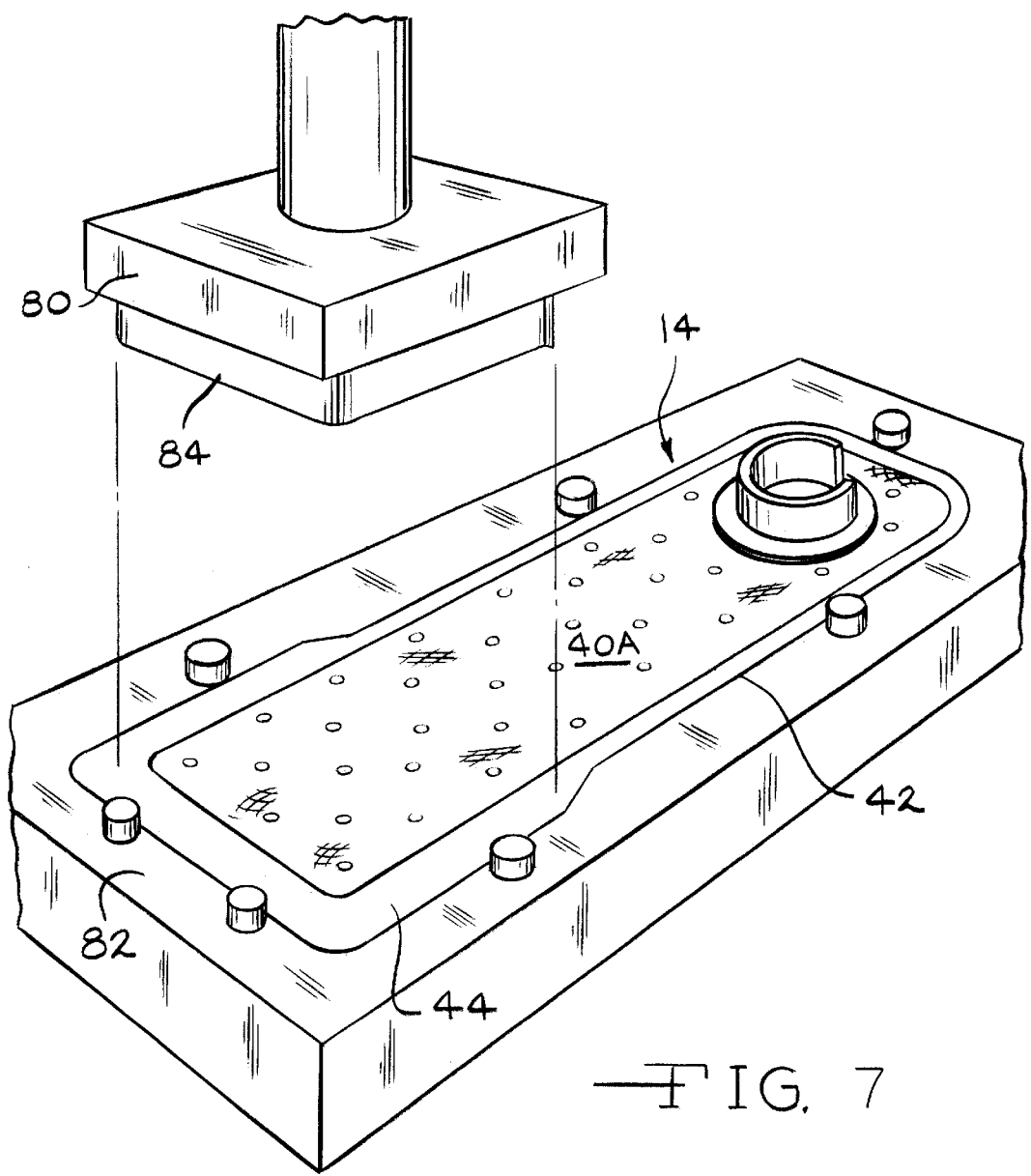
FIG. 7 is a perspective view of a cutting die having a U-shaped cutter or knife edge aligned with a peripheral seal of an in-tank fuel filter according to the present invention for facilitating the cutting of a portion of the peripheral seal to form the retaining member.

The preferred method of assembly of an in-tank fuel filter 14 having an integral retaining member 48 according to the present invention is illustrated in FIG. 7 and comprehends the following steps. First of all, the fuel filter 14 is assembled by appropriate methods so as to form a fuel filter 14 having a first panel of filtration media 40A, a second panel of filtration media 40B defining a common edge 42 and providing an interior space 54 between the first panel of filtration media 40A and the second panel of filtration media 40B, a peripheral seal 44 along at least a portion of the common edge 42 and a fuel outlet fitting 46. The fuel filter 14 is preferably positioned in a manner such that one end of the fuel filter 14 is placed directly underneath a cutting die 80 and directly over a resistance or supporting surface 82. Alternatively, of course, the fuel filter 14 can be positioned such that it is directly over a cutting die 80 and directly underneath a resistance surface 82. The cutting die 80 includes has a U-shaped cutter or knife edge 84 that is complementary in shape to the end of the fuel filter 14 and has a width that is at least slightly less than the total width of the fuel filter 14 and at least slightly greater than the interior width of the fuel filter 14, i.e., the width of the fuel filter 14 not including the peripheral seal 44.

After the fuel filter 14 is positioned in appropriate alignment with the cutting die 80, mechanical force is applied to the cutting die 80. The mechanical force can be generated by a variety of means including a hydraulic cylinder, a pneumatic cylinder or a conventional cam driven press and must be sufficient to drive the cutting die 80 through the peripheral seal 44. The resistance surface 82 provides a surface against which the cutting die 80 can be pressed to facilitate the cutting process. After the entire U-shaped cutter 84 has passed through the peripheral seal 44, the mechanical force is released and the cutting die 80 is retracted and returned to its initial position. This cutting process forms a retaining member 48 with junction areas 66 that are continuous with the peripheral seal 44. The assembly of an in-tank fuel filter 14 with an integral retaining member 48 according to the present invention is now complete.

The foregoing disclosure is the best mode devised by the inventors for practicing the invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims:

We claim:

1. An in-tank fuel filter comprising, in combination,
   a filter body having first and second panels of filtration media, defining an edge and an interior space,
   a peripheral seal along at least a portion of said edge,
   an outlet fitting secured to said first panel of filtration media, said outlet fitting defining a passageway providing fluid communication with said interior space, and
   a retaining member disposed on said peripheral seal, said retaining member cooperatively defining a closed loop with one of said first or said second panels of filtration media,
   whereby said opening receives a fuel pump body and retains said filter body adjacent said fuel pump body.

2. The in-tank fuel filter of claim 1 further including separating ribs disposed in said interior space of said filter body.

3. The in-tank fuel filter of claim 2 wherein said outlet fitting defines a plurality of projections disposed in said interior space of said filter body, said plurality of projections being interspersed among or between said separating ribs so as to define a hinge region,
   whereby said hinge region imparts flexibility onto said filter body.

4. The in-tank fuel filter of claim 1 wherein said retaining member is integrally formed on said peripheral seal.

5. The in-tank fuel filter of claim 1 wherein said retaining member is fixedly attached to said peripheral seal.

6. The in-tank fuel filter of claim 1 wherein said retaining member is U-shaped.

7. The in-tank fuel filter of claim 1 wherein said retaining member defines spurs for directing tearing of said retaining member away from said filter body.

8. An in-tank fuel filter, comprising, in combination,
   a filter body having first and second panels of filtration media, defining an edge and an interior space,
   a peripheral seal along at least a portion of said edge,
   an outlet fitting secured to said first panel of filtration media and defining a passageway providing fluid communication with said interior space, and
   a retaining member disposed on said peripheral seal, said retaining member defining spurs for directing tearing of said retaining member away from said filter body,
   whereby said retaining member is adapted to engage a fuel pump body and retain said filter body adjacent said fuel pump body.

9. The in-tank fuel filter of claim 8 further including separating ribs disposed in said interior space of said filter body.

10. A The in-tank fuel filter of claim 9 wherein said outlet fitting defines a plurality of projections disposed in said interior space of said filter body, said plurality of projections being interspersed among or between said separating ribs so as to define a hinge region,
    whereby said hinge region imparts flexibility to said filter body.

11. The in-tank fuel filter of claim 8 wherein said retaining member is integrally formed on said peripheral seal.

12. The in-tank fuel filter of claim 8 wherein said retaining member is fixedly attached to said peripheral seal.

* * * * *